Aug. 7, 1956 R. E. CORREA 2,757,886
MANUALLY SUSTAINED GLIDER TYPE AIRCRAFT
Filed May 10, 1955
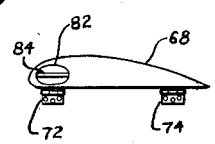
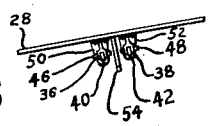
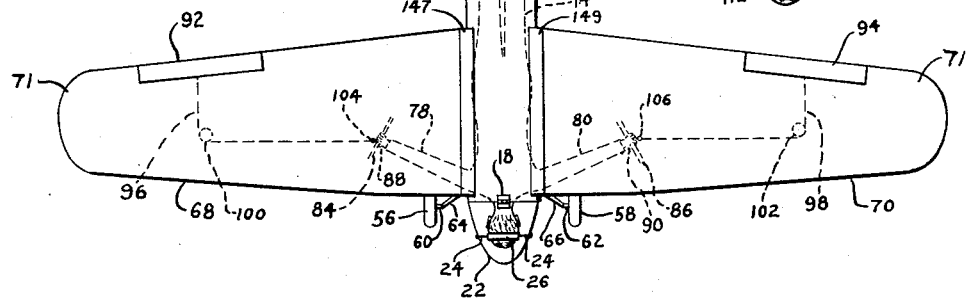
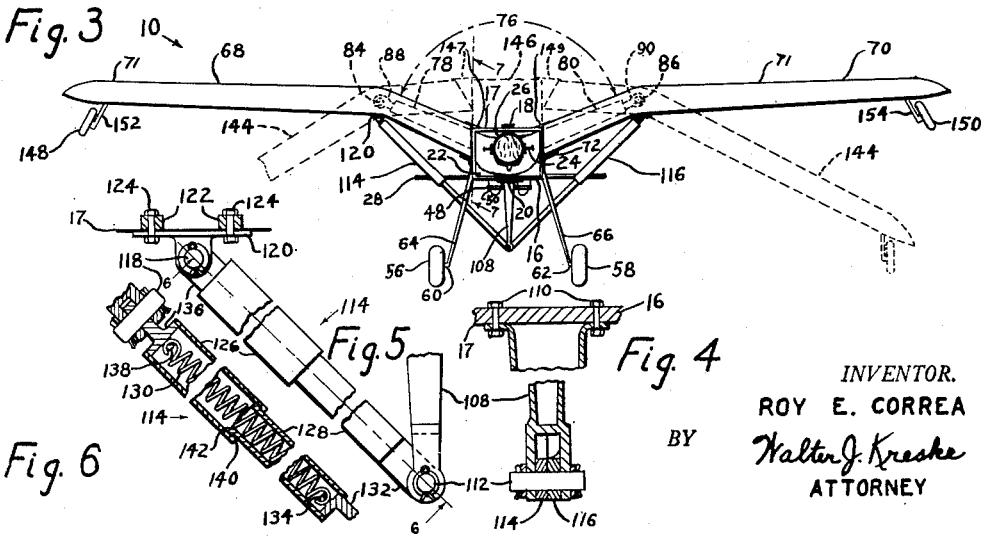
INVENTOR.
ROY E. CORREA
BY Walter J. Kreske
ATTORNEY

# United States Patent Office 2,757,886
Patented Aug. 7, 1956

2,757,886

MANUALLY SUSTAINED GLIDER TYPE AIRCRAFT

Roy E. Correa, Hudson, Mass.

Application May 10, 1955, Serial No. 507,301

4 Claims. (Cl. 244—64)

This invention relates to glider type aircraft and more particularly to an aircraft wherein an individual may manually sustain himself in flight after being initially launched to proper flying speed.

To sustain oneself in the air under one's own power like a bird has been often attempted in the past with relatively little success. A primary reason for this lack of success is that heretofore the structures involved have attempted to create lift by the flapping or beating of the air with wings much like that of a manually operated fan. The human body does not have the energy and is not sufficiently strong to cope with the leverage and air resistance forces encountered on the broad expanse of a wing being flapped.

These problems are overcome in the present invention by providing a structure which rather than flapping the wings or beating the air with the wings to obtain lift, utilizes air flow over the wing sections caused by a forward glide for maintaining lift and a simple raising of the operator's body to gain altitude for achieving a continued glide. Applicant's flying machine must first be launched to an initial glide speed above the stalling speed of the aircraft. Thereafter, the operator by lifting his body above its previous level provides an incremental height or additional glide altitude from which to maintain the speed necessary for the proper air flow lift over the wing sections. By repetitive incremental lifts of this type, the aircraft may be sustained in the air in a continuous glide.

Applicant's aircraft structure is of extremely light glider type construction. The wings include air foil configuration having high lift and low drag characteristics to make maximum utilization of air currents for sustaining flight in manner similar to that in existing gliders. The incorporation of the body lifting principle for gaining altitude for a continued glide need be resorted to only when natural air currents have become insufficient to sustain flight. Under such conditions, even in still air, by the use of applicant's body lift principle a sufficient glide speed for maintaining sustained flight above the stalling speed is achieved.

Accordingly, a primary object of the present invention is to provide an aircraft which, once launched into the air above the stalling speed of the craft, may be maintained in flight under the manual power of the operator.

Another object is to provide an aircraft which is manually operated by the occupant and depends for lift by air flow over the wing sections from a forward glide as distinguished from flapping of the wings, glide altitude being maintained by the occupant lifting himself in successive incremental steps above his previous relative position.

A further object is the provision of an aircraft adapted to utilize natural air currents for providing lift in flight and capable of augmenting such natural air current lift by increasing glide altitude through successive incremental body lifts of the operator.

A further object is the provision of an aircraft utilizing principles of glider construction with pivotally mounted wings adapted for incremental lifts of the fuselage with the operator therein during flight above the stalling speed.

These and other features, objects and advantages of the present invention will become more apparent from the following description taken in connection with the accompanying drawings of preferred embodiments of the invention and wherein:

Fig. 1 is a side view of an aircraft constructed in accordance with applicant's invention with wings shown outstretched in the normal flight position;

Fig. 2 is a top view of the embodiment shown in Fig. 1 and taken in the direction of arrow 2;

Fig. 3 is a front view of the aircraft shown in Fig. 2;

Fig. 4 is a cross sectional view to enlarged scale of a typical downwardly depending strut support structure used in the embodiment shown in Fig. 1;

Fig. 5 is a front view to enlarged scale of a telescoping strut member with end mounting structure attached thereto used in the embodiment shown in Fig. 1;

Fig. 6 is a cross sectional view of the telescoping strut member taken on line 6—6 of Fig. 5;

Fig. 7 is an end view of the base of a wing of the embodiment shown in Fig. 1 and taken on line 7—7 of Fig. 3 in the direction of the arrows;

Fig. 8 is a rear view of the tail structure taken in the direction of arrow 8 in Fig. 1 to more clearly show operating mechanism for the elevator flap arrangement in the tail structure;

Fig. 9 is a view of an alternative construction of a downwardly depending support member and strut members suitable for use in the embodiment shown in Fig. 1.

Referring to the drawings in more detail, the aircraft is designated generally by the numeral 10 (Figs. 1, 2 and 3). The aircraft 10 has an elongated fuselage or body structure 12 fitting closely about an occupant or operator 14 in the prone position. The body structure 12 is of extremely light construction such as is used in gliders and may consist of a wooden rib framework 16 (Fig. 3) covered with suitably doped, light, cloth fabric covering 17. The front end of the fuselage 12 has fixed thereto, by a hinge 18 and spring clasp 20, a transparent, protective shield 22. The shield 22 has preferably the shape of a dome to provide a stream line effect for minimizing drag. The dome 22 may be of any suitable transparent material such as the plastic Lucite. Suspended within the dome 22 as by cords 24 which are fixed to the sides of the dome 22, is a head band support 26 fitted to the forehead of the occupant 14. The head band support 26 may be of a resilient protective material as leather to provide a protective headrest as well as a relaxing support arrangement for the occupant 14.

A tail structure 28 extends rearwardly from the fuselage 12. The tail structure may consist of a continuation of the light framework construction of the fuselage 12 and covered with the treated fabric 17. The tail structure 28 has an elevator flap 30 at its rearward end. The elevator flap 30 is mounted by pivots or hinges 32 and 34 for pivotal movement about the axis of the pivots 32 and 34. Operating brackets 36 and 38 are each fixed at one end to the elevator flap 30. The operating brackets 36 and 38 each have a yoke structure at the other end for pivotally mounting operating rods 40 and 42 respectively. The operating rods 40 and 42 are slidably supported at the rear end of the fuselage 12 by suitable guide members 44. The forward ends of the operating rods 40 and 42 have stirrups 46 and 48 respectively for each receiving one of the feet 50 and 52 of the occupant 14 for thereby operating the elevator flap 30.

Also, attached to the rigid portion of the tail structure 28 is a tail skid 54 of conventional construction for providing support to the aircraft while on the ground.

The forward end of the aircraft 10 is preferably supported by light weight pneumatic wheels 56 and 58 carried on axles 60 and 62. The axles 60 and 62 are fixed to an end of flexible support braces 64 and 66 respectively. The other ends of the flexible support braces 64 and 66 are rigidly fixed to the framework 16 of the fuselage 12.

Extending outwardly at each side of the fuselage 12 are wings 68 and 70. The wings 68 and 70 are of light, glider construction having cross-sectional air foil design such as shown at Fig. 7 to provide a high lift and low stalling speed characteristic for the aircraft 10. The wings 68 and 70 have preferably a light wood framework covered by a suitably doped fabric 71 similar to that used on the fuselage 12 and tail structure 28.

The base section or fuselage end of the wings 68 and 70 are mounted by pivots or hinges 72 and 74 to the fuselage 12 to pivot about the axis of the hinges or pivots 72 and 74 which are substantially parallel to the longitudinal axis of the fuselage 12. The base section or fuselage end of the wings 68 and 70 extend outwardly and upwardly from the fuselage 12 at a substantial dihedral angle 76 to receive the backwardly thrust, outstretched arms 78 and 80 of the occupant 14. Also, for this purpose, the internal structure of this inclined base portion of each of the wings 68 and 70 is provided with a sufficiently large hollow portion 82 in the structural ribwork of the wings to receive the outstretched arms 78 and 80 of the occupant 14. Hand gripping bars or handles 84 and 86 are provided in the wings 68 and 70 at positions distal from the fuselage 12 such that the occupant 14 may comfortably grasp the respective handles 84 and 86 with hands 88 and 90 of his outstretched arms 78 and 80. The handles 84 and 86 are rigidly fixed to or made integral with the framework structure of the wings 68 and 70.

The wings 68 and 70 may also be provided with pivotally mounted ailerons 92 and 94 operated by cord systems 96 and 98 and pulleys 100 and 102 respectively. The cords 96 and 98 are run to the hands 88 and 90 of the occupant 14 and are provided with rings 104 and 106 for operation of the ailerons 92 and 94 by the fingers of the occupant 14.

Extending downwardly from the fuselage 12 is a rigid support member 108. The downwardly depending support member 108 is fixed at its upper end to the rib framework 16 of the fuselage 12 as by bolts 110. The lower end of the support member 108 has pivotally mounted thereto, by a pivot pin 112, telescoping struts 114 and 116. The strut 114 is pivotally fixed by a pin 118 to a bracket 120 which is fixed to the brace framework 122 of the wing 68 as by bolts 124. The telescoping strut 116 which is similar in construction to the strut 114, is fixed to the wing 70 in similar manner.

The telescoping strut 114 has upper and lower tubular members 126 and 128 respectively which house a tension spring 130. The lower tubular member 128 has a bottom closure 132 rigidly fixed thereto as by welding or other suitable means. The bottom closure 132, in addition to providing a structure for mounting to the pivot pin 112, has on its inward side a projecting lug 134 for anchoring the bottom end of the tension spring 130. Similarly, upper tubular member 126 has a closure 136 which is fixed thereto by welding or other suitable means. The upper closure 136 is pivotally fixed by the pivot pin 118 between downwardly extending yoke members of the bracket 120. The closure 136, also, has a lug 138 for anchoring the other end of the tension spring 130. An inwardly projecting flange 140 on the upper tubular member 126 is slidably arranged on the lower tubular member 128. The flange 140 acts as a stop which engages an outwardly projecting flange 142 on the lower tubular member 128 for limiting the outward telescoping movement of the telescoping members 126 and 128. Fig. 6 shows the strut 114 in its maximum extended condition.

In this maximum extended condition, the wings 68 and 70 are held in their fully extended flight position shown by the solid lines in Figs. 1, 2 and 3. The springs 130 in this maximum extended condition of the struts 114 and 116 exert a tensile pull upon the respective wings 68 and 70, yieldably pulling them toward the position shown by the dotted lines 144 (Fig. 3). In this dotted line position, the telescoping members 114 and 116 are decreased in length to accommodate the movement upward of the fuselage 12 to the position shown by the dotted lines 146 (Fig. 3). Flexible webs or strips 147 and 149 such as of rubber may have edges fixed to the fuselage 12 and wings 68 and 70 respectively to retain continuity of upper aircraft surface during upward movement of the fuselage 12.

The wings 68 and 70 are also provided with small, light support skid wheels 148 and 150, respectively. The wheel 148 is fixed to the outer end of the wing 68 by a support arm 152 and the wheel 150 is fixed to the wing 70 by a support arm 154.

In operation of the aircraft 10, when there is no upward lift on the wings 68 and 70, as from air flow over the wings, the tensile force from the springs 130 in the truts 114 and 116 will cause the wings 68 and 70 to move downwardly with respect to the fuselage 12 to the position shown by the dotted lines 144 and 146 in Fig. 3. In this down position, the wheels 148 and 150 at the respective wing tips provide support against the runway or terrain to increase stability for towing and to prevent injury to the wings. When the aircraft 10 is towed, as by a motor vehicle or an airplane, along the runway, airflow occurs over the wings 68 and 70 which results in a lift force on the wings. When the airflow becomes sufficiently rapid, the resulting lift will cause the wings to rise to the position shown by the solid lines in Fig. 3. The springs 130 in struts 114 and 116 are preferably so selected that as the forward speed of the aircraft 10 reaches or exceeds the stalling speed, the wings 68 and 70 will be in the normal flight position shown by the solid lines in Fig. 3. In this normal flight position the struts 114 and 116 will be extended to their maximum length, at which length the flanges 140 and 142 interfere with each other to provide positive support against further upward movement of the wings 68 and 70 with respect to the fuselage 12. Upon exceeding the stalling speed, the aircraft 10 will rise from the runway and become launched in the air where the occupant 14 may take advantage of wind currents and air movement such as is normally done by glider pilots. By the use of the ailerons 92 and 94 and the elevator flap 30, the occupant 14 can control the direction and rate of climb of the aircraft 10. When natural air currents become insufficient to sustain flight, the occupant 14 may resort to a downward glide to maintain air speed over the wings 68 and 70 to provide the lift needed to sustain flight. To regain altitude, the occupant 14, with his hands 88 and 90 grasping the handles 84 and 86, may lift himself along with the fuselage structure 12 to the position shown by the dotted lines 146. It is noted that since airlift on the wings 68 and 70 is such as to sustain flight, the lift by the operator will be on his body and the fuselage 12 to cause it to rise to the new height shown by the dotted lines 146. The resulting pivoting of the wings on the hinges 72 and 74 will cause the wings to tilt downwardly as shown by the dotted lines 144. This may give the illusion of flapping of the wings, but the movement is relatively slow and is in fact only a lifting of the occupant's body and the fuselage 12 and not a flapping. It is the airflow over the wings and not this pivotal movement which creates the flight sustaining lift. Because of the tension from springs 130, the occupant 14 is assisted in lifting himself to the new position.

Even at this new tilted position, the airflow over the wings 68 and 70 will continue to sustain the aircraft 10 in the air. In the new position shown by the dotted lines 144 and 146, the occupant 14, by relaxing his arms and ceasing to exert pressure on the handles 84 and 86, causes the normal lift on the wings 68 and 70 to move the wings rapidly upwardly back to their normal flight position with respect to the fuselage 12. Thus the wings 68 and 70 will have risen an incremental distance above their former normal flight position. By this lifting maneuver, the aircraft 10 will have gained an incremental distance of altitude. By repeating this lifting movement, additional altitude in incremental steps may be obtained to permit continued downward glide of the aircraft 10 for maintaining air speed and to augment that from natural air currents.

An alternative construction to that of the strut and support structure shown in Figs. 4, 5 and 6 is that shown in Fig. 9. In this alternative embodiment, the struts 114 and 116 are replaced by rigid non-telescoping members 155 and 157 and the downwardly depending support member 108 is replaced by a telescoping member with a compression spring 156. The compression spring 156 is housed in a lower telescoping member 158 and an upper telescoping member 160. The compression spring 156 is preferably of a deflection strength such that it will be depressed a maximum distance by the weight of the occupant 14. This maximum deflection is such that the upper telescoping member 160 will have a limiting movement downward against a shoulder 162 on the lower telescoping member 158. Shoulders 164 and 166 are provided on the lower telescoping member 158 and upper telescoping member 160 respectively to limit the elongation or extension of the telescoping members to limit the pivotal movement of the wings 68 and 70 to that substantially shown by the dotted lines 144. Except as explained above, operation of the aircraft 10 in this second embodiment will be similar to that explained with regard to the first embodiment.

This invention is not limited to the particular details of construction shown as equivalents will suggest themselves to those skilled in the art.

What I claim is:

1. A glider type aircraft comprising a fuselage about an elongated axis, said fuselage having a hollow interior compartment for carrying an occupant in prone position along said axis, a tail section on said fuselage, pivot means on either side of said fuselage, said pivot means having a pivotal axis substantially parallel to the fuselage axis, a wing extending laterally from either side of said fuselage transversely to the fuselage axis and pivotally mounted at the fuselage end of each of the wings by said pivot means to said fuselage, said wings having a cross sectional configuration providing a high degree of lift from air flow over the wings, means at a position distal from said pivot axis on each of said wings for manually lifting said fuselage and occupant with respect to said wings, and yieldable support means engaging each of said wings and fuselage for limiting the upward movement of said wings with respect to said fuselage.

2. A glider type aircraft comprising an elongated body structure closely fitted about a prone human occupant for supporting said occupant, a tail structure on said body structure extending rearwardly from a position adjacent the feet of said occupant, a glider type wing on each side of said body structure, hinge means fixed to said body structure and each of said wings for pivotally mounting the wings to said body structure, a hollow portion in each of said wings, said hollow portion extending outwardly from said body structure for receiving an outstretched arm of the occupant, a handle in said hollow portion providing support to the outstretched arm for manually lifting the occupant and the support structure with respect to said wings, a telescoping strut connected between each of said wings and said body structure for limiting upward movement of said wings with respect to said body structure, and a spring in said telescoping strut pulling yieldably downwardly on said wings with respect to said body structure.

3. A glider type aircraft comprising a fuselage for carrying an occupant, a tail section on said fuselage, a pivotally mounted wing on each side of said fuselage for swinging about said pivots in a direction transverse to said fuselage, a downwardly depending telescoping support member rigidly fixed at one end to said fuselage, rigid strut members pivotally mounted between the other end of said telescoping support member and each of said wings, spring means in said telescoping member for yieldably forcing said wings downwardly with respect to said fuselage, and hand gripping means in said wings for manually lifting said fuselage and occupant upwardly with respect to said wings.

4. A glider type aircraft comprising an elongated body structure for closely fitting about a prone human occupant to support said occupant, a tail structure on said body structure extending rearwardly from a position adjacent the feet of said occupant, an elevator flap pivotally mounted on said tail structure, operating lever means fixed to said elevator flap, stirrups on said operating lever means for operative engagement with said feet, a glider type wing on each side of said body structure, hinge means fixed to said body structure and each of said wings for pivotally mounting the wings to said body structure, a hollow portion in each of said wings, said hollow portion extending outwardly from said body structure for receiving an outstretched arm of the occupant, a handle in said hollow portion at a position distal from said pivotal mounting for manually lifting the occupant and the support structure with respect to said wings, an aileron on each of said wings, a cord and pulley system for each of said ailerons in operative relation to said handles, a downwardly depending support member rigidly fixed at its upper end to the under side of said body structure, a telescoping strut connected between each of said wings and the other end of said support member, stop means on said telescoping members for limiting upward movement of said wings with respect to said body structure, and spring means in said telescoping struts for yieldably forcing the struts toward a reduction in length and thereby pulling yieldably downwardly on said wings with respect to said body structure.

References Cited in the file of this patent

UNITED STATES PATENTS

| | | |
|---|---|---|
| 1,137,212 | Jelalian | Apr. 27, 1915 |
| 1,354,728 | De Crequy | Oct. 5, 1920 |
| 1,845,913 | Goodman | Feb. 16, 1932 |